United States Patent
Hiasa

(10) Patent No.: US 11,195,055 B2
(45) Date of Patent: Dec. 7, 2021

(54) IMAGE PROCESSING METHOD, IMAGE PROCESSING APPARATUS, STORAGE MEDIUM, IMAGE PROCESSING SYSTEM, AND MANUFACTURING METHOD OF LEARNT MODEL

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/808,484

(22) Filed: Mar. 4, 2020

(65) Prior Publication Data

US 2020/0285901 A1    Sep. 10, 2020

(30) Foreign Application Priority Data

Mar. 5, 2019 (JP) .............................. JP2019-039088

(51) Int. Cl.
   *G06K 9/40* (2006.01)
   *G06K 9/62* (2006.01)
   *G06T 3/40* (2006.01)

(52) U.S. Cl.
   CPC ............ *G06K 9/6257* (2013.01); *G06K 9/40* (2013.01); *G06K 9/6262* (2013.01); *G06T 3/4046* (2013.01)

(58) Field of Classification Search
   CPC ...... G06K 9/40; G06K 9/6262; G06T 3/4046; G06T 5/002
   See application file for complete search history.

(56) References Cited

U.S. PATENT DOCUMENTS

2007/0258640 A1* 11/2007 Abe .................. G06T 7/001
                                                      382/159
2010/0066868 A1    3/2010 Shohara

FOREIGN PATENT DOCUMENTS

JP    2016110232 A    6/2016

OTHER PUBLICATIONS

Extended European Search Report issued in European Appln. No. 20160909.6 dated Jul. 15, 2020.
Yang "Deep Learning for Single Image Super-Resolution: A Brief Review" arXiv:1808.03344v1. Aug. 9, 2018: pp. 1-15.
Ronneberger "U-Net: Convolutional Networks for Biomedical Image Segmentation." arXiv: 1505.04597v1. May 18, 2015: pp. 1-8. Cited in the specification.
Uchida "Non-blind Image Restoration Based on Convolutional Neural Network" arXiv: 1809.03757v1. Sep. 11, 2018.

* cited by examiner

*Primary Examiner* — Sam Bhattacharya
(74) *Attorney, Agent, or Firm* — Rossi, Kimms & McDowell LLP

(57) ABSTRACT

An image processing method includes acquiring input data including an input image and a noise map representing a noise amount in the input image based on an optical black area corresponding to the input image, and inputting the input data into a neural network to execute a task of a recognition or regression.

17 Claims, 14 Drawing Sheets

IMAGE PROCESSING METHOD, IMAGE PROCESSING APPARATUS, STORAGE MEDIUM, IMAGE PROCESSING SYSTEM, AND MANUFACTURING METHOD OF LEARNT MODEL

BACKGROUND OF THE INVENTION

Field of the Invention

The present invention relates to an image processing method that can improve robustness against noises in a neural network.

Description of the Related Art

Japanese Patent Laid-Open No. ("JP") 2016-110232 discloses a method for determining a position of a recognition target in an image with high accuracy using a neural network.

However, the method disclosed in JP 2016-110232 reduces the determination accuracy when the image has a low S/N ratio. Since the noises in the image depend on the performance of an image sensor and the ISO speed during imaging, images with noises having various intensities can be input to the neural network. The low S/N ratio will reduce the recognition accuracy, since the object feature amount cannot be exclusively extracted due to the noise influence.

There are two conceivable methods for improving the robustness of the neural network against the noises. The first method is to include images with various noise amounts in learning data for the neural network. This method can improve the robustness against the noises but may reduce the maximum accuracy value. The second method is to learn the neural network for each different noise amount. This method needs to store a learning result for each noise amount, and may cause a data amount to increase.

SUMMARY OF THE INVENTION

The present invention provides an image processing method and the like, each of which can maintain high accuracy and a small data amount, and improve robustness against noises in a neural network.

An image processing method according to one aspect of the present invention includes acquiring input data including an input image and a noise map representing a noise amount in the input image based on an optical black area corresponding to the input image, and inputting the input data into a neural network to execute a task of a recognition or regression. An image processing apparatus corresponding to the image processing method and a non-transitory computer-readable storage medium storing a program for causing a computer to execute the above image processing method also constitute another aspect of the present invention.

An image processing system according to another aspect of the present invention includes a first device and a second device configured to communicate with the first device. The first device includes a transmitter configured to transmit a request for causing the second device to process a captured image. The second device includes a receiver configured to receive the request transmitted by the transmitter, an acquirer configured to acquire input data including the captured image and a noise map representing a noise amount in the captured image based on an optical black area corresponding to the captured image, a processor configured to input the input data into a neural network to execute a task of a recognition or regression, and a transmitter configured to transmit a result of the task.

An image processing method or a method for manufacturing a learnt model according to another aspect of the present invention includes acquiring ground truth data and input data that includes a training image and a noise map representing a noise amount in the training image based on an optical black area corresponding to the training image, and learning a neural network for executing a task of a recognition or regression using the input data and the ground truth data. A non-transitory computer-readable storage medium storing a program for causing a computer to execute the above image processing method and an image processing apparatus also constitute another aspect of the present invention.

Further features of the present invention will become apparent from the following description of exemplary embodiments with reference to the attached drawings.

DESCRIPTION OF THE EMBODIMENTS

Figure 1:
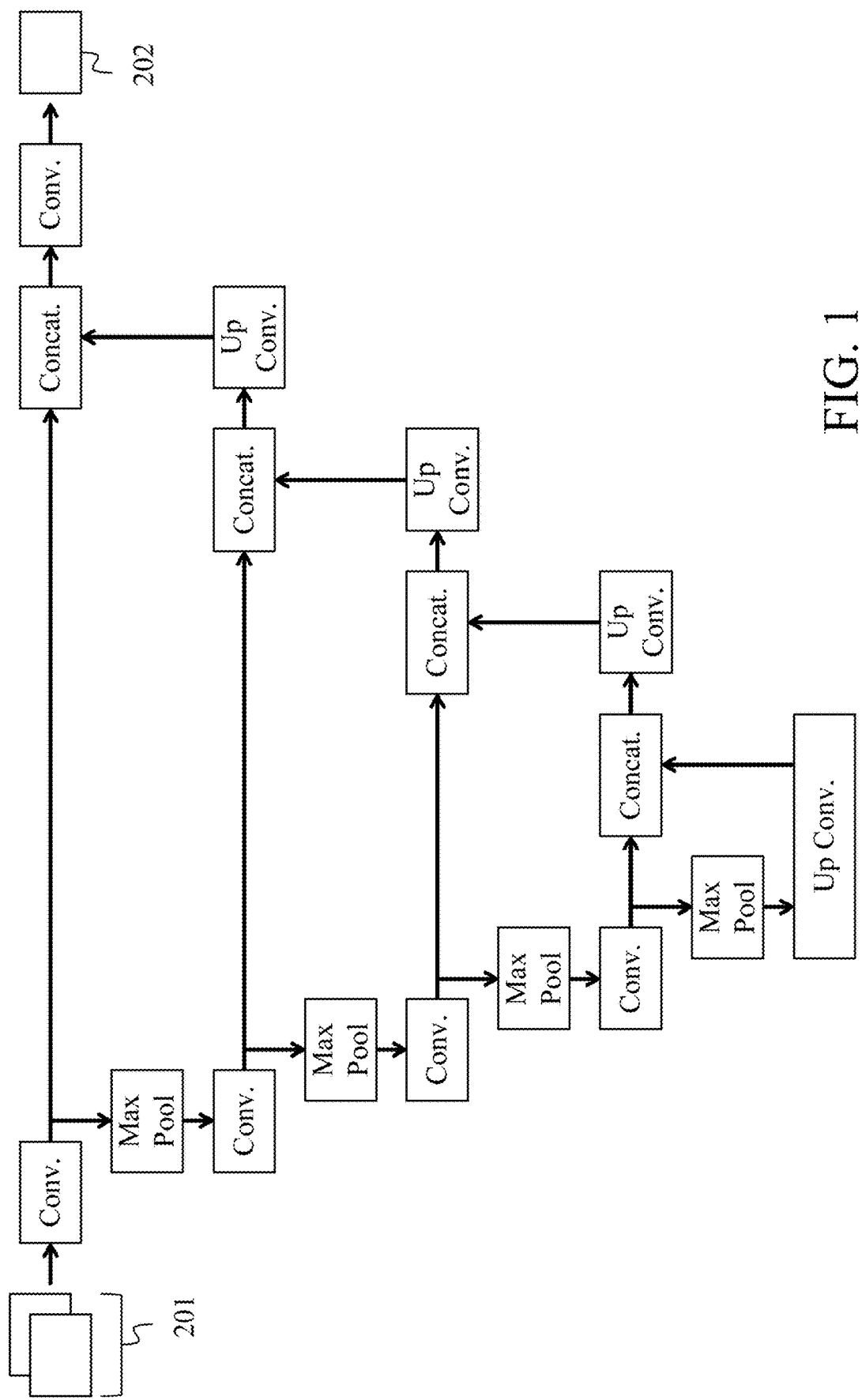
FIG. 1 illustrates a configuration of a neural network according to a first embodiment.

Referring now to the accompanying drawings, a detailed description will be given of embodiments according to the present invention. Corresponding elements in respective figures will be designated by the same reference numerals, and a duplicate description thereof will be omitted.

Before a specific description is given of this embodiment, the gist of the present invention will be described. The present invention improves the robustness against noises in a task of a recognition or regression using a neural network. Now where "x" (d-dimensional vector where d is a natural number) is input data to be input to the neural network, the recognition is a task of finding a class "y" corresponding to the vector x. For example, there is a task of classifying objects in an image into a person, a dog, a car, and the like, and a task of recognizing a facial expression such as a smiling face or a crying face from a face image. The class y is generally a discrete variable, and may be a vector in generating a segmentation map or the like. On the other hand, the regression is a task of finding a continuous variable y corresponding to the vector x. For example, there is a task of estimating a noise-free image from a noise included image, and a task of estimating a high-resolution image before downsampling from a downsampled image.

In the following embodiment, an input image and a noise representation image (noise map or two-dimensional noise distribution information) corresponding to the input image are used for input data in order to improve the robustness against noises. The noise representation image is an image representing the noise amount in the input image. The noise representation image is an image based on optical black corresponding to the input image, or an image based on noise characteristics of an image sensor that has captured the input image. The robustness against the noises can be improved while the accuracy is maintained by inputting both the noise representation image and the input image, because even if learning is performed by mixing a plurality of noise amounts, the neural network can specify the noise amount in the input image.

In the following description, the step of learning the weight of the neural network will be referred to as a learning phase, and the recognition or regression step with the learned weight will be referred to as an estimation phase.

First Embodiment

A description will now be given of an image processing system according to a first embodiment of the present invention. In the first embodiment, the neural network executes a recognition task of detecting a human area in an image (segmentation of a human). However, the present invention is not limited to this embodiment, and is similarly applicable to another recognition or regression task.

Figure 2:
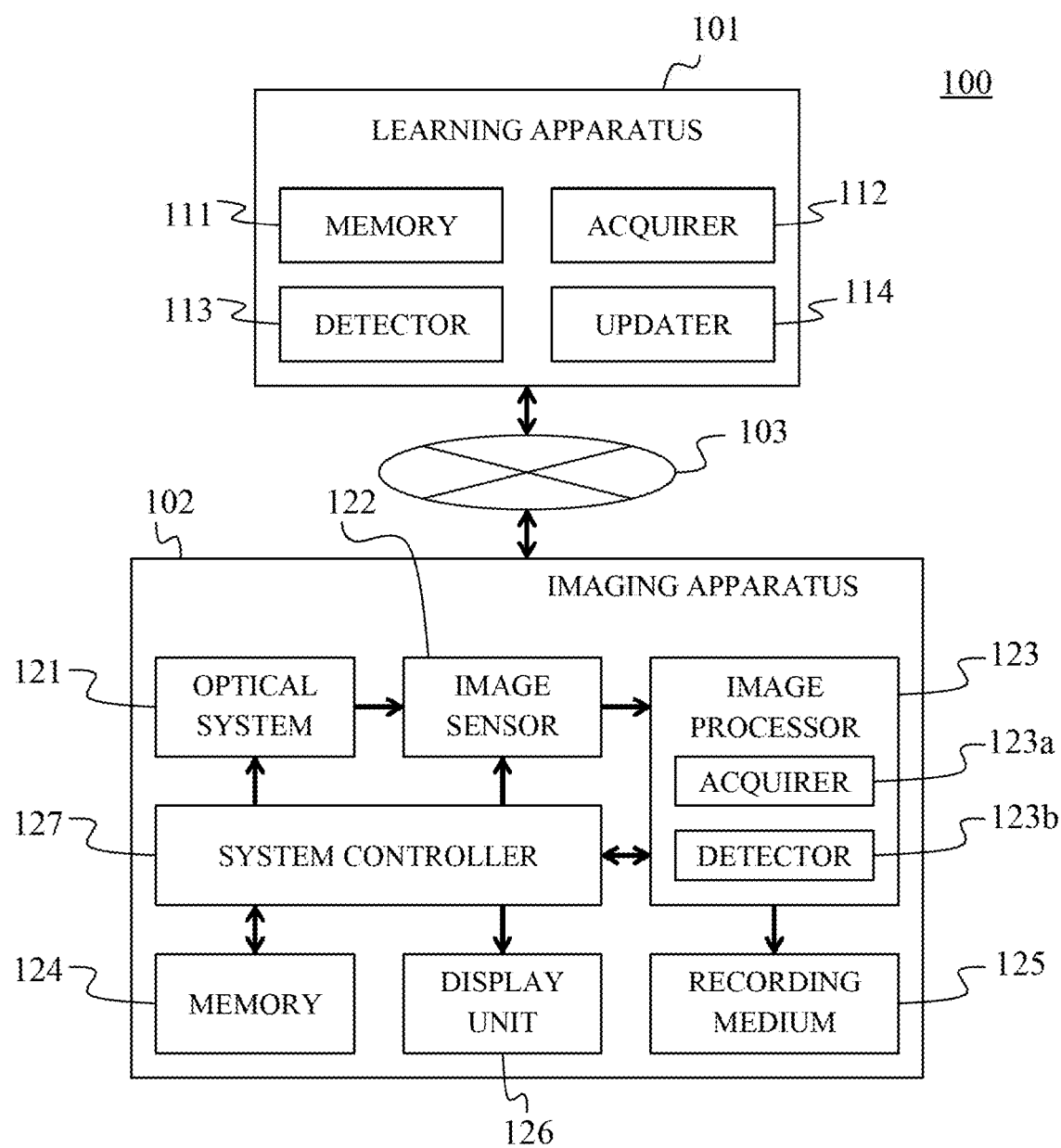
FIG. 2 is a block diagram of an image processing system according to the first embodiment.
Figure 3:
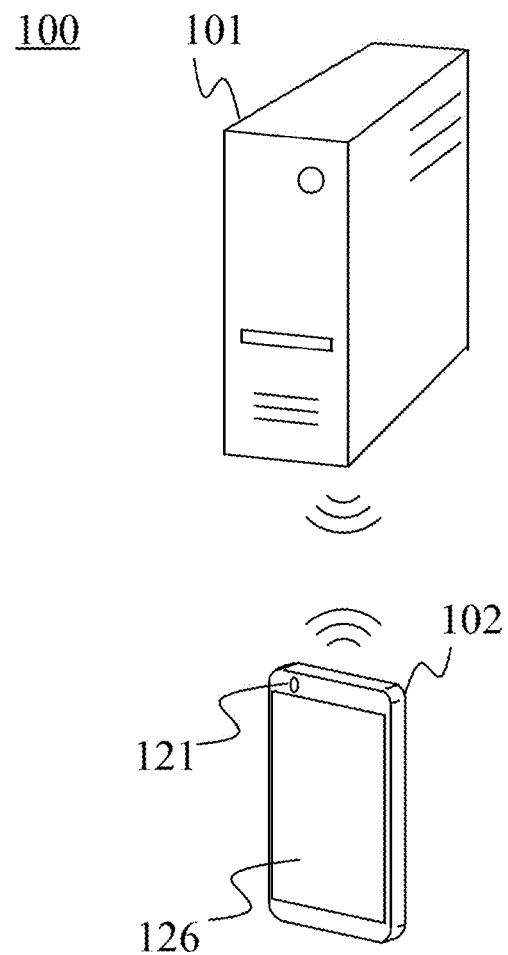
FIG. 3 is an external view of the image processing system according to the first embodiment.

FIG. 2 is a block diagram of the image processing system 100 according to this embodiment. FIG. 3 is an external view of the image processing system 100. The image processing system 100 includes a learning apparatus 101, an imaging apparatus (image pickup apparatus) 102, and a network 103. The learning apparatus 101 includes a memory 111, an acquirer (acquisition unit) 112, a detector (detection unit) 113, and an updater (update unit) 114, and learns the weight of the neural network that detects a human area. The details of this learning will be described later. Weight information learned by the learning apparatus 101 is stored in the memory 111. The imaging apparatus 102 acquires a captured image and detects a human area using the neural network.

The imaging apparatus 102 includes an optical system 121 and an image sensor 122. The optical system 121 collects light that has entered the imaging apparatus 102 from the object space. The image sensor 122 receives an optical image (object image) formed via the optical system 121 and acquires (photoelectrically converts) the captured image. The image sensor 122 includes, for example, a CCD (Charge Coupled Device) sensor or a CMOS (Complementary Metal-Oxide Semiconductor) sensor.

The image processor 123 includes an acquirer 123a and a detector 123b, and detects the human area by setting at least part of the captured image as an input image. In this time, the information on the weight stored in the memory 124 is used. The weight information is previously read out of the learning apparatus 101 via the wired or wireless network 103 and stored in the memory 124. The stored weight information may be a numerical value of the weight itself or has an encoded form. Details regarding the detection processing of the human area will be described later. The image processor 123 performs different processing for the human area and the other areas to generate an output image. For example, by blurring the area other than the human area, a portrait image with a blur is generated. The output image is stored in the recording medium 125. Alternatively, the captured image may be stored as it is in the recording medium 125, and then the image processor 123 may read the captured image out of the recording medium 125 and detect the human area. The output image stored in the recording medium 125 is displayed on the display unit 126 according to a user's instruction. A series of operations are controlled by a system controller 127.

Figure 4:
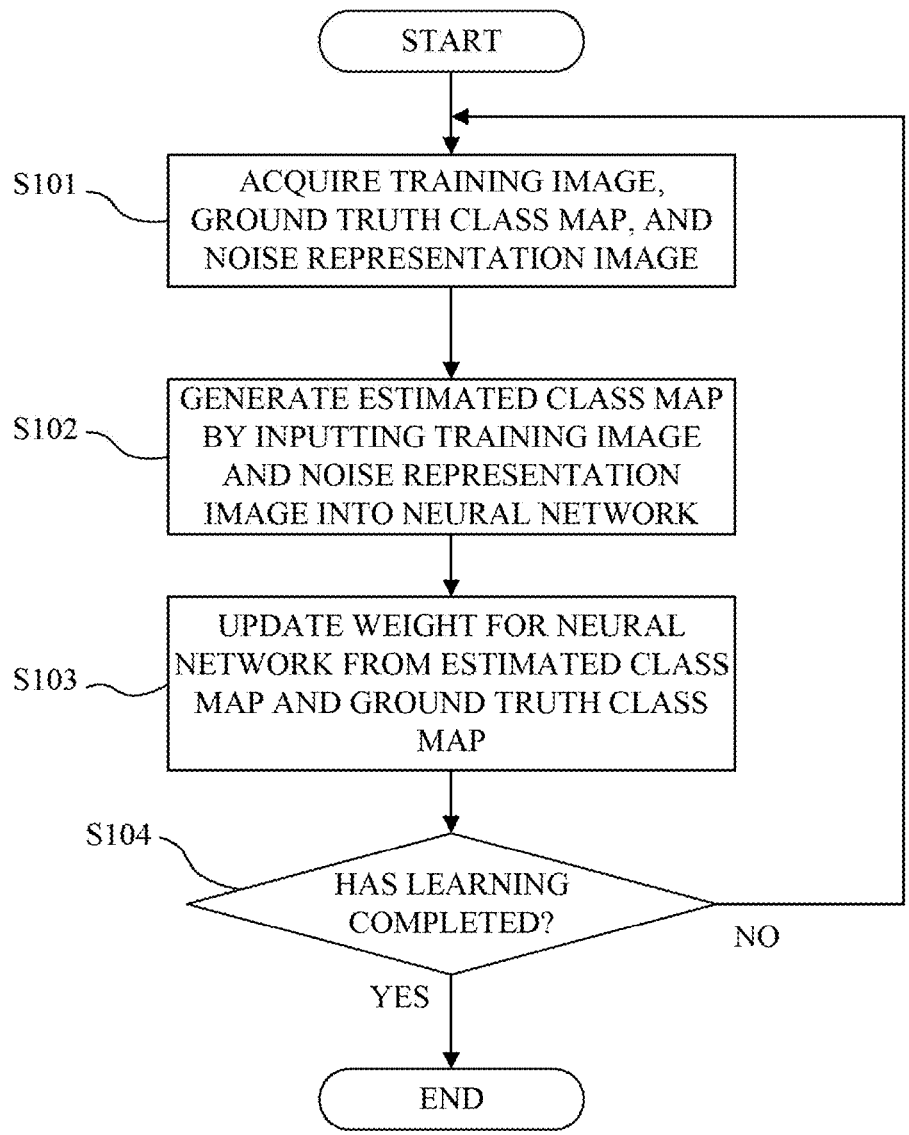
FIG. 4 is a flowchart of weight learning according to the first embodiment.

Referring now to FIG. 4, a description will be given of the weight learning (manufacture of a learnt model) by the learning apparatus 101 according to this embodiment. FIG. 4 is a flowchart of the weight learning. Each step in FIG. 4 is mainly executed by the acquirer 112, the detector 113, or the updater 114 in the learning apparatus 101.

Initially, in the step S101, the acquirer 112 acquires one or more pairs of a training image and a ground truth class map (also referred to as a ground truth segmentation map or ground truth data), and a noise representation image. The training image is an input image in the learning phase of the neural network.

Figure 5A:
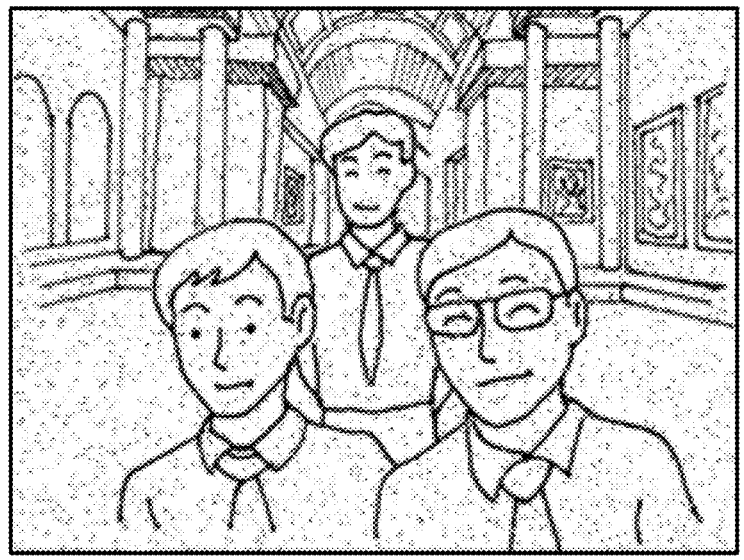
FIGS. 5A and 5B illustrate an illustrative training image and an illustrative ground truth class map according to the first embodiment.
Figure 5B:
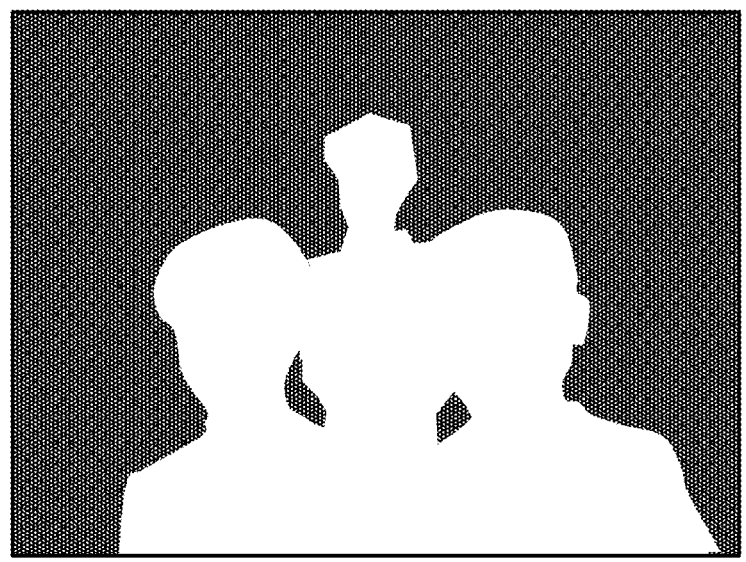

FIG. 5A illustrates an example of a training image and a ground truth class map. FIG. 5A illustrates an example of a training image, and FIG. 5B illustrates a corresponding ground truth class map. White in FIG. 5B denotes a class representing the human area, and gray denotes a class representing other areas. In this embodiment, the noise representation image is an image having a signal value set to the standard deviation of noises existing in the training image. However, the present invention is not limited to the standard deviation, and may use, for example, a variance as long as the (degree of) dispersion represents the noise amount. Alternatively, the value of the ISO speed may be used instead of the dispersion.

The learning phase uses a plurality of training images having various imaging scenes and noise amounts so as to stably detect the human area even in an unknown imaging scene or an image having a noise amount in the estimation phase. A method of adding noises to images of various imaging scenes by simulation is the first method of preparing a plurality of training images having different noise amounts. This method acquires the standard deviation of the noises set to be added, and a noise representation image having the standard deviation value for each element (pixel). Since the shot noise component in the noises depends on the light amount, the standard deviation of the noise changes depending on the magnitude of the signal value (light amount). If the noise characteristic of the image sensor 122 is known, a noise representation image with the standard deviation can be acquired which depends on the light amount in both the learning and estimation phases. More specifically, the signal value of each pixel in the input image or the training image is converted into a light amount (if necessary, an inverse gamma correction is applied), and the standard deviation of the noises is stored based on the light amount converted for each pixel in the noise representation image. Since the input image and the training image have already had noises, a value slightly deviates from the standard deviation calculated from the true signal. If the noise characteristic of the image sensor 122 is unknown, the estimation phase calculates the standard deviation of the noises from the optical black area (black level area). Hence, the noise representation image in the learning phase is obtained using the standard deviation of the noises at a light amount of zero.

The second method is a method of capturing a variety of imaging scenes by changing the ISO speed or using an image sensor having a different sensitivity. In this case, an image sensor having a known noise characteristic is used for imaging, and the standard deviation of the noises of the training image is acquired from the known noise characteristic. Alternatively, the standard deviation of the noises at the light amount of zero is obtained from the signal value of the optical black area in the image sensor when the training image is captured. The noise representation image is an image in which the signal value of each pixel has a standard deviation, as in the first method. The training image has the same format as the input image in the estimation phase. If the input image in the estimation phase is an undeveloped raw image, the training image is also an undeveloped raw image. If the input image in the estimation phase is a developed image, the training image is also a developed image. The number of pixels in the input image and the number of pixels in the training image in the estimation phase do not have to be equal to each other.

Next, in the step S102 in FIG. 4, the detector (learner or learning unit) 113 inputs the training image and the noise representation image into the neural network, and generates an estimated class map. In this embodiment, the neural network is a U-Net illustrated in FIG. 1 (see a Ronneberger, P. Fischer, and T. Brox, "U-net: Convolutional networks for biomedical image segmentation," arXiv: 1505.04597 for details), but the present invention is not limited to this embodiment.

The input data 201 is data obtained by concatenating the training image and the noise representation image in the channel direction. The training image may have a plurality of channels of RGB (Red, Green, Blue). The noise representation image may have only one channel or the same number of channels as those of the training image. The number of pixels (number of elements) per channel of the training image and the noise representation image is the same. Although training images with various amounts of noise are input to the neural network, the neural network can specify the noise amount in the training image by including a noise representation image in the input data. Therefore, it is possible to ensure the robustness against noises while suppressing a decrease in estimation accuracy.

Input data may be normalized as needed. When the input image is a RAW image, the black level may be different depending on the image sensor and the ISO speed. Therefore, after subtracting the black level from the signal value of the input image, the signal is input to the neural network. The normalization may also follow the subtraction of the black level. In FIG. 1 "Conv." denotes one or more convolutional layers, "Max Pool" denotes maximum pooling, "Up Conv." denotes one or more convolutional layers including upsampling, and "Concat." denotes a connection in the channel direction. In the initial learning, the weight of the filter for each convolutional layer is determined at random. An estimated class map 202, which is an output of U-Net corresponding to the training image, is calculated.

Next, in the step S103, the updater (learner or learning unit) 114 updates the weight for the neural network from the estimated class map and the ground truth class map. While this embodiment uses for the loss function the cross entropy between the estimated class map and the ground truth class map, the present invention is not limited to this embodiment. The weight is updated from the calculated value of the loss function by an error backpropagation method (backpropagation) or the like.

Next, in the step S104, the updating unit 114 determines whether the weight learning has been completed. Completion of learning can be determined based on whether or not the number of iterations of learning (weight updates) has reached a specified value, or whether or not the weight changing amount during updating is smaller than a specified value. If it is determined that the learning has not yet been completed, the flow returns to the step S101, and one or more new training images, noise representation images, and ground truth class images are acquired. On the other hand, when it is determined that the learning has been completed, the learning is terminated, and the weight information is stored in the memory 111.

Figure 6:
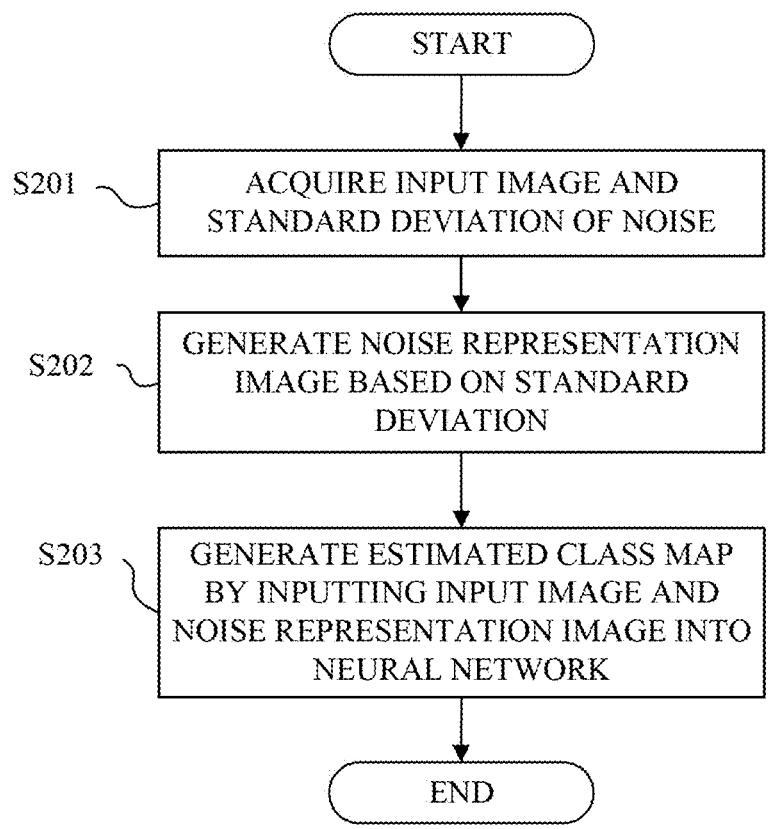
FIG. 6 is a flowchart of the way of generating an estimated class map according to the first embodiment.

Referring now to FIG. 6, a description will be given of the way of the human area (the way of generating an estimated class map or estimation phase) in an input image by the image processor 123 according to this embodiment. FIG. 6 is a flowchart of the way of generating the estimated class map. Each step in FIG. 6 is mainly executed by the acquirer 123a or the detector 123b in the image processor 123.

Initially, in the step S201, the acquirer 123a acquires an input image and a standard deviation of noises corresponding to the input image. The input image is at least part of the image captured by the image sensor 122. When the noise characteristic of the image sensor 122 is known, the standard deviation of the noises is obtained based on the imaging condition (such as the ISO speed) during imaging. Alternatively, the standard deviation of the noises may be calculated from the signal value of the optical black area under the same imaging condition as that of the input image. For example, when the captured image is the undeveloped RAW image, an area in the captured image in which information on the object space is obtained is set to the input image, and an area where light is blocked is set to the optical black area corresponding to the input image. The standard deviation of the noises at the light amount of zero can be obtained from a variation of signal values in the optical black area.

Next, in the step S202, the acquirer 123a generates the noise representation image based on the standard deviation. The noise representation image is an image in which the signal value of each pixel has the standard deviation. Next, in the step S203, the detector 123b inputs the input image and the noise representation image into the neural network, and generates the estimated class map. At this time, the weight obtained in the learning phase with the neural network in FIG. 1 is used.

This embodiment can realize an image processing system that can generate a segmentation map robust against noises while maintaining high accuracy and a small data amount.

Second Embodiment

A description will be given of an image processing system according to a second embodiment of the present invention. In this embodiment, the neural network executes a regression task (deblur) for correcting aberrations and blurring due to diffraction of a captured image. However, the invention is not limited to this embodiment, and is applicable to another recognition or regression task.

Figure 7:
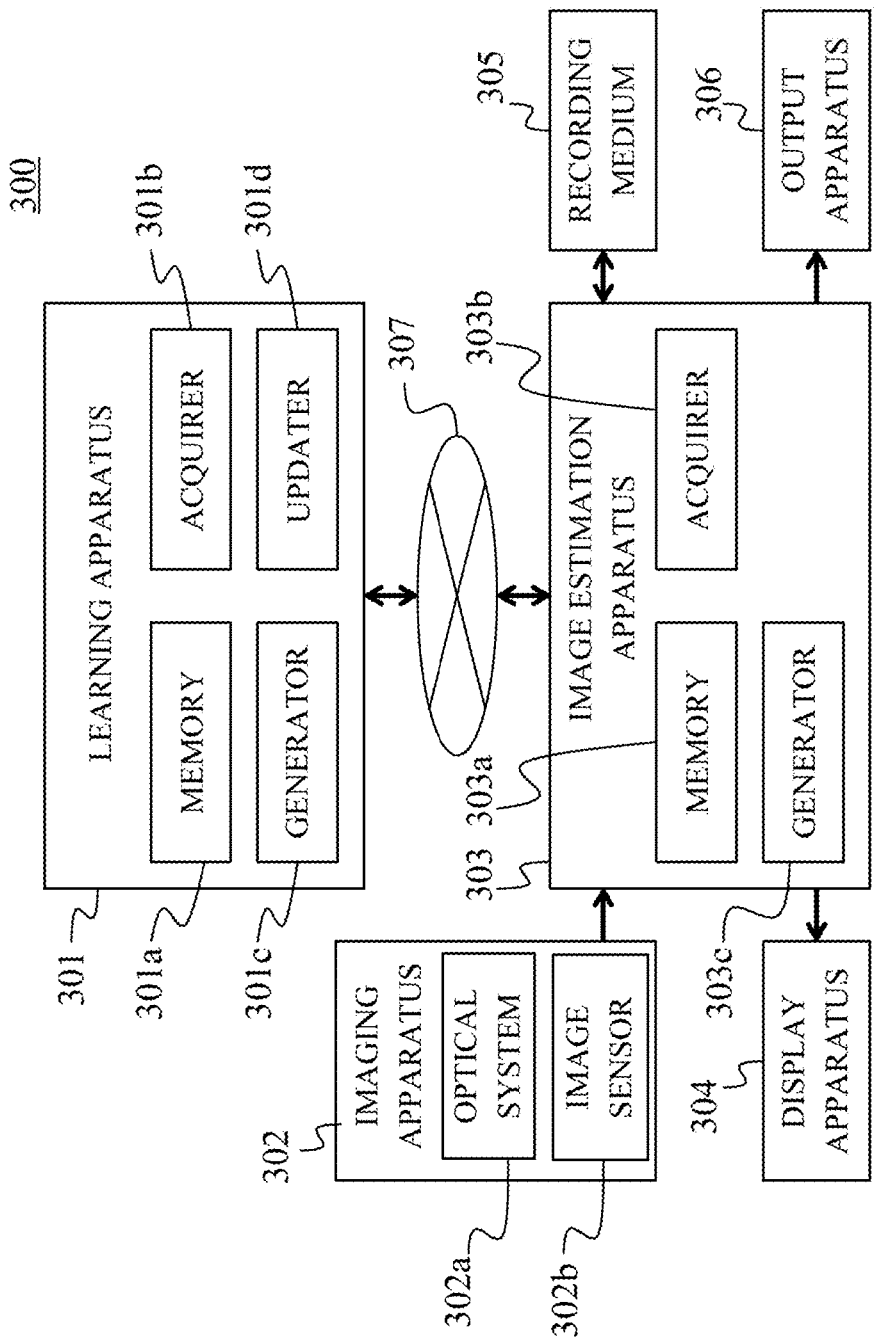
FIG. 7 is a block diagram of an image processing system according to a second embodiment.
Figure 8:
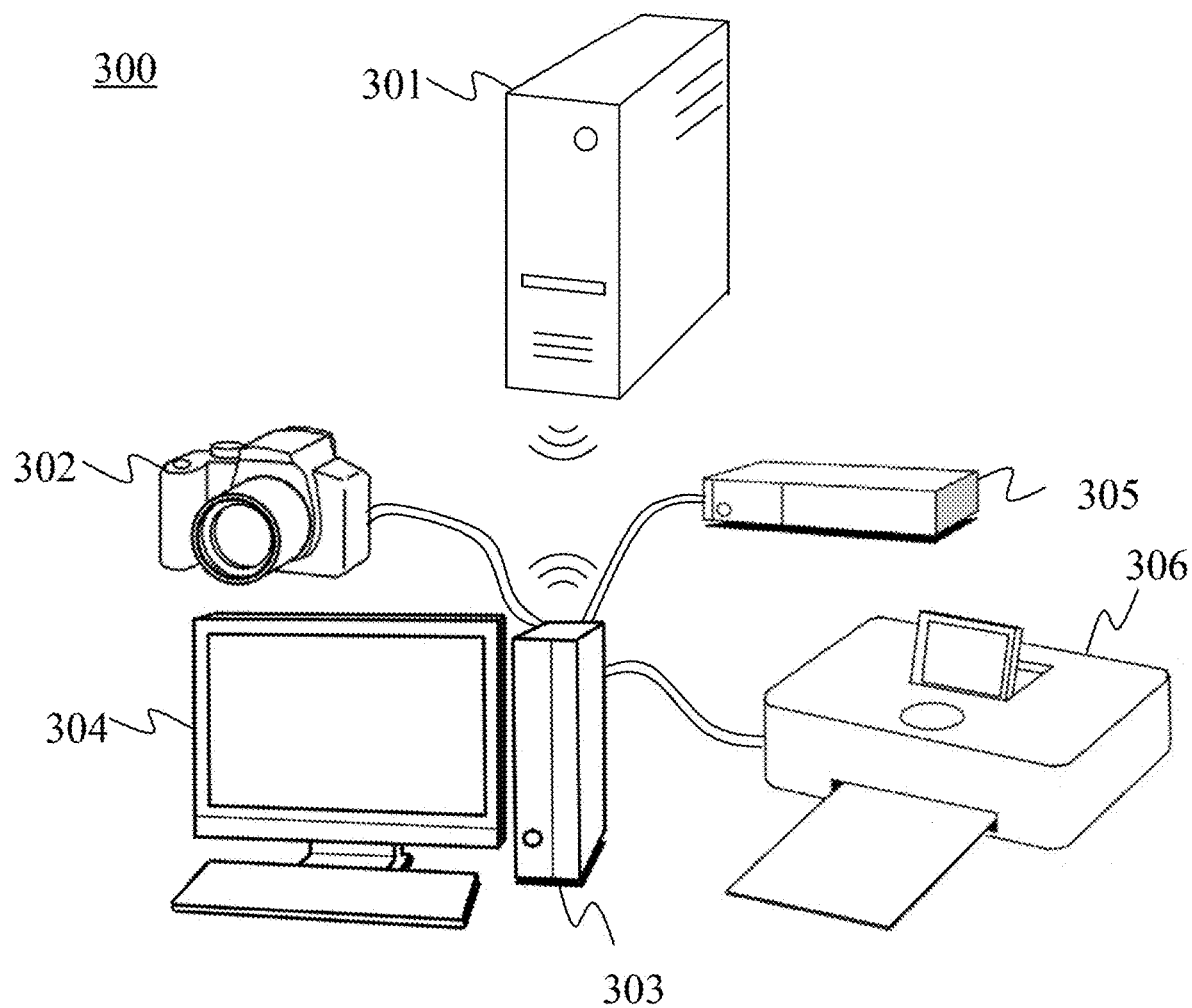
FIG. 8 is an external view of the image processing system according to the second embodiment.

FIG. 7 is a block diagram of an image processing system 300 according to this embodiment. FIG. 8 is an external view of the image processing system 300. The image processing system 300 includes a learning apparatus 301, an imaging apparatus 302, an image estimation apparatus 303, a display apparatus 304, a recording medium 305, an output apparatus 306, and a network 307.

The learning apparatus 301 includes a memory 301a, an acquirer 301b, a generator 301c, and an updater 301d. The imaging apparatus 302 includes an optical system 302a and an image sensor 302b. The image captured by the image sensor 302b is blurred due to the aberration and diffraction of the optical system 302a and the noises due to the image sensor 302b. The image estimation apparatus 303 includes a memory 303a, an acquirer 303b, and a generator 303c, corrects the blur in the input image that is at least part of the captured image, and generates an estimated image. A neural network is used to correct the blur, and information on the weight is read out of the memory 303a. The weight has been learned by the learning apparatus 301, and the image estimation apparatus 303 has previously read the weight information out of the memory 301a via the network 307 and stored the information in the memory 303a. The details of the weight learning and the blur correction processing using the weight will be described later. The image estimation apparatus 303 performs development processing for the estimated image to generate an output image. The output image is output to at least one of the display apparatus 304, the recording medium 305, and the output apparatus 306. The display apparatus 304 is, for example, a liquid crystal display or a projector. The user can perform an editing operation or the like via the display apparatus 304 while checking the image being processed. The recording medium 305 includes, for example, a semiconductor memory, a hard disk drive, a server on a network, or the like. The output device 306 is a printer or the like.

Figure 9:
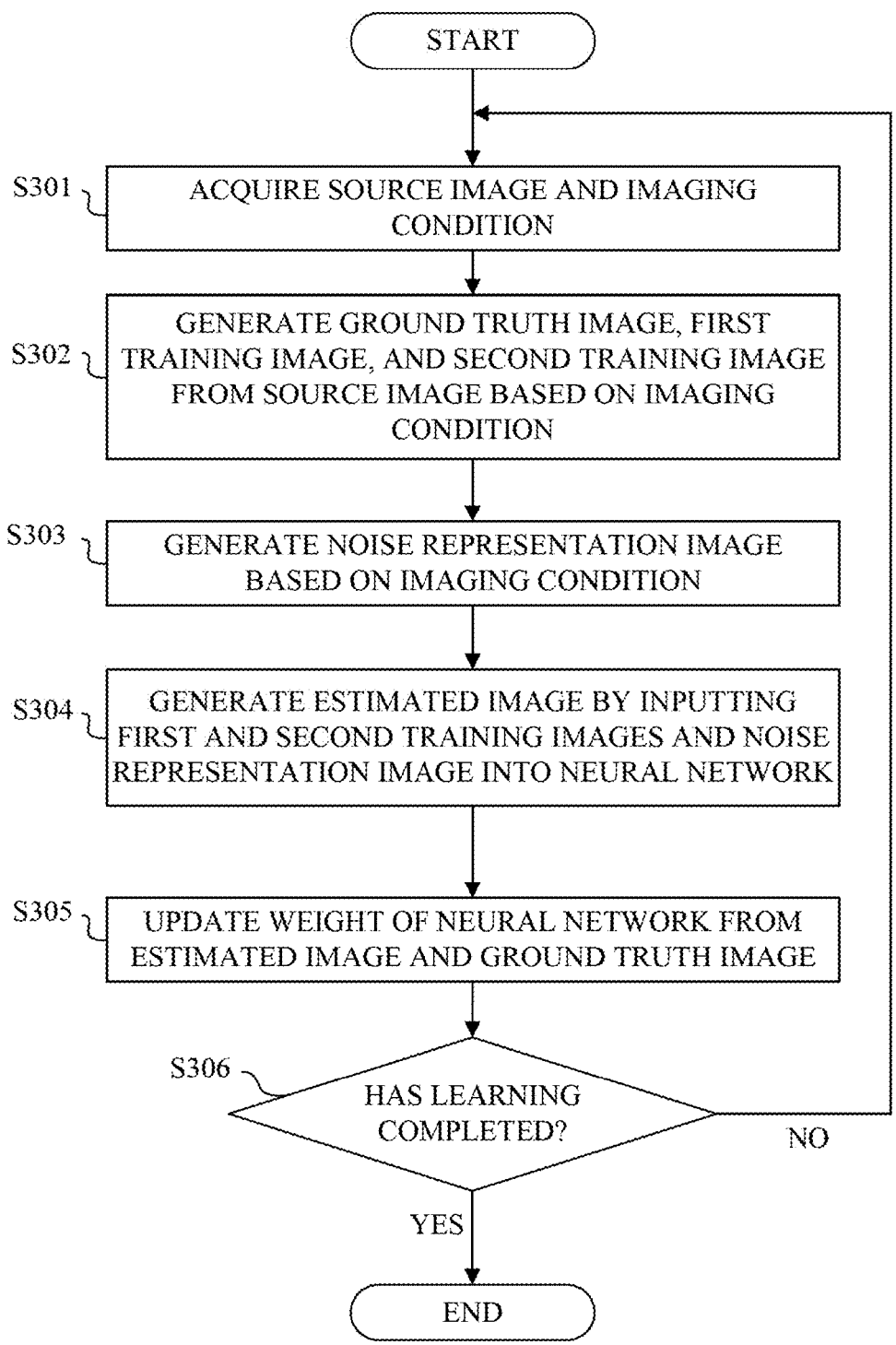
FIG. 9 is a flowchart of weight learning according to the second embodiment.

Referring now to FIG. 9, a description will be given of the weight learning by the learning apparatus 301. FIG. 9 is a flowchart of the weight learning. Each step in FIG. 9 is mainly executed by the acquirer 301b, the generator 301c, or the updater 301d in the learning apparatus 301.

Initially, in the step S301, the acquirer 301b acquires one or more sets of source image(s) and imaging condition(s). Learning the blur correction by the aberration and diffraction requires a pair of a blurred image (first training image) and an image having no blurs (ground truth image). The second embodiment generates this pair from the source image by the imaging simulation. However, the present invention is not limited to this embodiment, and the pair may be prepared by capturing the same object may with a lens for which the blurs caused by the aberration and diffraction are to be corrected and a higher performance lens.

This embodiment performs the learning and the blur correction for the RAW image, but the present invention is not limited to this embodiment and may use a developed image. The source image is a RAW image, and the imaging condition is a parameter for performing the imaging simulation using the source image as the object. The parameter includes the optical system used for imaging, the state of the optical system (such as the zoom, the F-number, the focus distance), the image height, the presence and type of the optical low-pass filter, the noise characteristic of the image sensor, the pixel pitch, the ISO speed, the color filter array, the dynamic range, the black level, and the like. The second embodiment performs the learning for each optical system. A plurality of combinations of the state, the image height, the pixel pitch, the ISO speed, and the like are set for a specific optical system, and a pair of a first training image and a ground truth image (ground truth data) are generated under different imaging conditions.

Next, in the step S302, the generator 301c generates a first training image, a second training image, and a ground truth image from the source image based on the imaging condition. The first training image and the ground truth image are respectively an image obtained by adding blurs caused by the aberration and the diffraction generated in the optical system to the source image and an image obtained by adding no blurs to the source image. The noises are added to the first training image. The noises are added to the ground truth image as needed. If no noises are added to the ground truth image or if noises that are uncorrelated with the noises of the first training image are added, the neural network learns the blur correction and denoising. When the noises correlated with the noises of the first training image are added to the ground truth image, the blur correction that suppresses the noise changes is learned.

This embodiment uses a Wiener filter for the first training image to generate a second training image (an intermediate blur corrected image in the learning phase) in which the blur has been corrected to some extent. The Wiener filter is a filter calculated from the blur applied to the first training image. However, the correction method is not limited to the Wiener filter, and another method may be used, such as an inverse filter-based method and the Richardson-Lucy method. Using the second training image can improve the robustness of the blur correction against the blur changes in the neural network. The source image is reduced as needed during the imaging simulation. When the source image is prepared not by CG (computer graphics) but by actual imaging, it is an image captured through a certain optical system. Hence, blurs already exist due to the aberration and the diffraction. However, the reduction can reduce the influence of the blur and generate the ground truth image existing up to high frequencies.

Next, in the step S303, the generator 301c generates a noise representation image based on the imaging condition. In this embodiment, the noise representation image is generated by reproducing a signal value of an optical black area (a black level area) by simulation. An optical black signal value is generated by adding noises corresponding to the ISO speed to the black level set under the imaging conditions.

Figure 10:
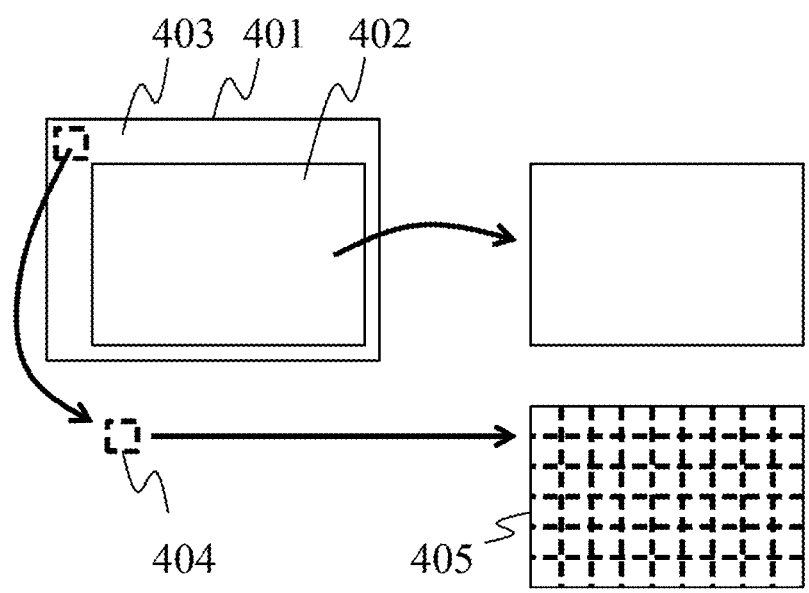
FIG. 10 illustrates the way of generating an input image and a noise representation image according to the second embodiment.

FIG. 10 illustrates the generations of the input image and the noise representation image. In the estimation phase, a noise representation image 405 is generated by extracting and arraying one or more partial optical black images 404 from the optical black area 403 in the captured image 401, as illustrated in FIG. 10. Hence, a noise representation image may be generated in a similar manner in the learning phase. Assume K (K is a natural number) is the number of partial optical black images to be extracted, and $m_k \times n_k$ (k=1, . . . , K) is the number of pixels in the partial optical black image. At this time, even this step generates a noise representation image by generating K optical blacks each having $m_k \times n_k$ and arraying them. The number of pixels of the noise representation image is the same as that of each of the first and second training images. The order of the steps S302 and S303 in FIG. 9 is not limited.

Figure 11:
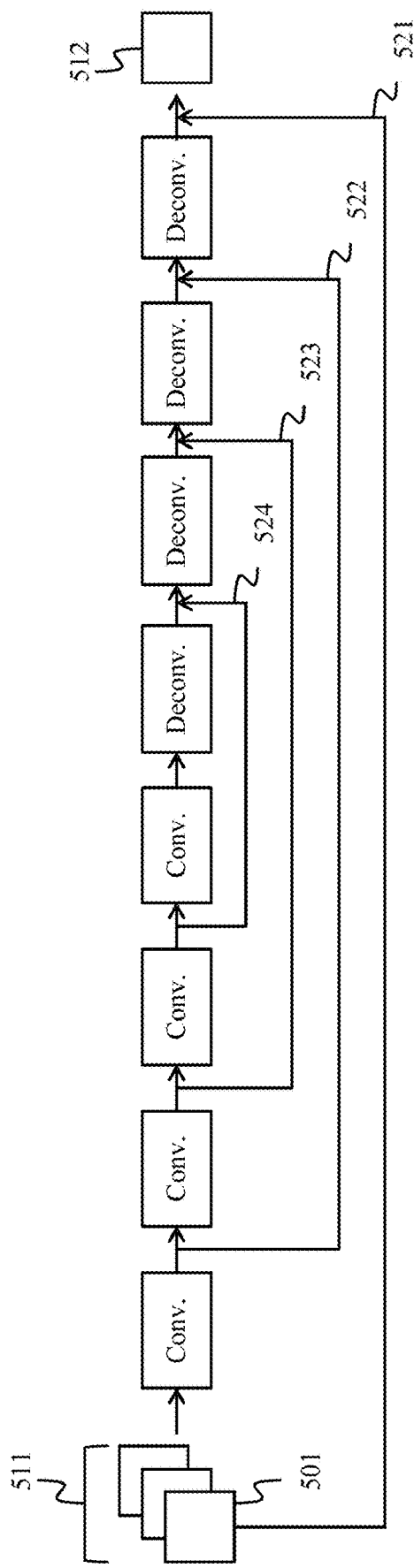
FIG. 11 illustrates a configuration of a neural network according to the second embodiment.

Next, in the step S304, the generator 301c inputs the first training image, the second training image, and the noise representation image into the neural network to generate an estimated image (blur corrected image). FIG. 11 illustrates a configuration of a neural network according to this embodiment. This embodiment uses the neural network illustrated in FIG. 11, but the present invention is not limited to this embodiment. For example, GAN (Generative Adversary Network) may be used. Input data 511 is data obtained by connecting a first training image 501, the second training image, and the noise representation image in the channel direction. There is no restriction on the connection order in the channel direction. "Conv." denotes one or more convolutional layers, and "Decov." denotes one or more deconvolution layers. Second, third, and fourth skip connections 522, 523, and 524 take the sum of the two feature maps for each element. Alternatively, they may be connected to one another in the channel direction. A first skip connection 521 obtains an estimated image 512 by taking the sum of the first training image 501 (or the second training image) and the residual component output from the final layer. However, the number of skip connections is not limited to FIG. 11. In making higher the resolution and contrast of an image such as a blur correction, not only an object but also noises may be emphasized. However, by inputting the noise representation image, the neural network can easily separate the object and the noise, and realize the high resolution or high contrast robust against the noises.

Next, in the step S305, the updater 301d updates the weight for the neural network from the estimated image and the ground truth image. This embodiment sets to the loss function the Euclidean norm of the difference between the signal values of the estimated image and the ground truth image. However, the loss function is not limited to this embodiment. Next, in the step S306, the updater 301d determines whether learning has been completed. If the learning has not yet been completed, the flow returns to the step S301 to acquire a new set of one or more source image(s) and imaging condition(s). On the other hand, when the learning has been completed, the weight information is stored in the memory 301a.

Figure 12:
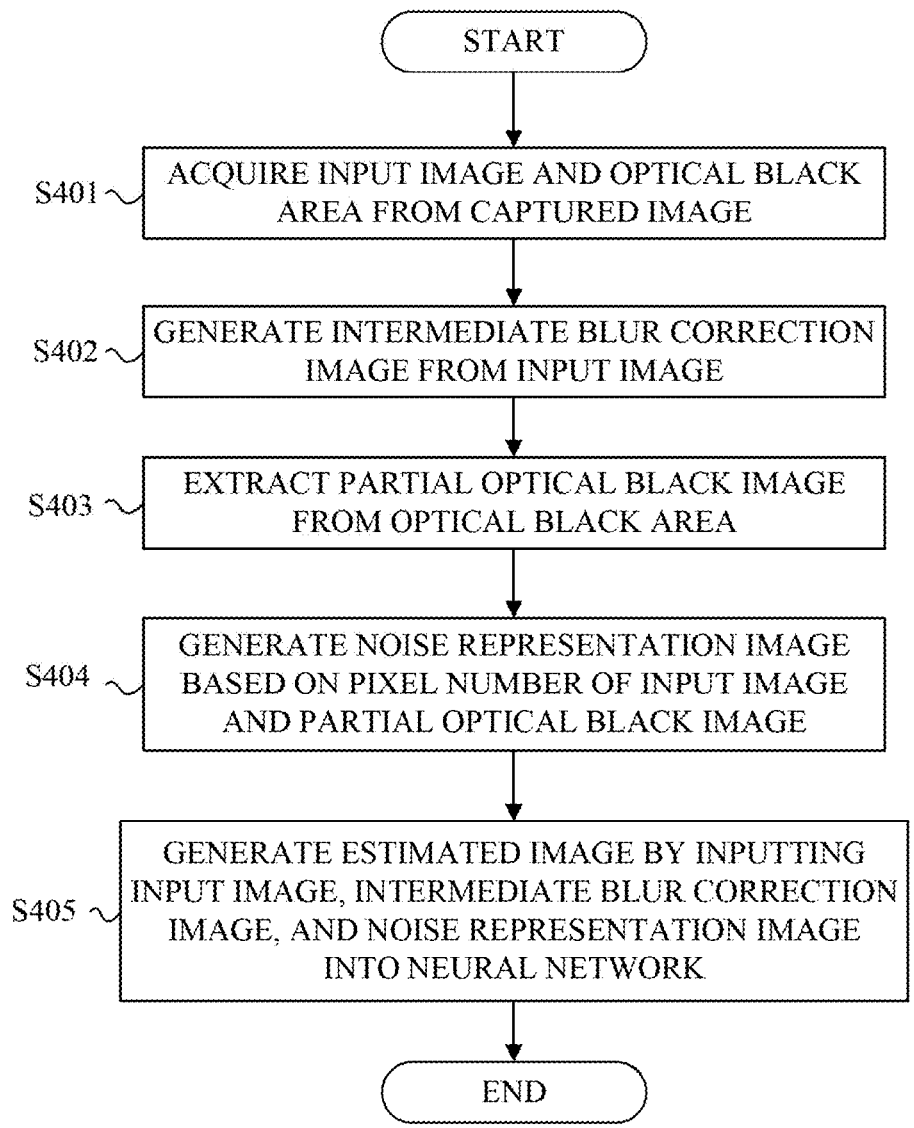
FIG. 12 is a flowchart of the way of generating an estimated image according to the second embodiment.

Referring now to FIG. 12, a description will be given of the way of correcting blurs caused by the aberration and the diffraction in the input image (the way of generating the estimated image) executed by the image estimation apparatus 303. FIG. 12 is a flowchart of the way of generating the estimated image. Each step in FIG. 12 is mainly executed by the acquirer 303b and the generator 303c in the image estimation apparatus 303.

Initially, in the step S401, the acquirer 303b acquires an input image and an optical black area corresponding to the input image from the captured image. The second embodiment acquires an area where information on the object space exists as an input image 402 and an area where light does not enter as an optical black area 403, as illustrated in FIG. 10, from a captured image 401 that is a RAW image. However, the optical black area can be obtained from another image under the same imaging condition as that of the input image.

Next, in the step S402, the generator 303c generates an intermediate blur corrected image from the input image. The information of the Wiener filter that corrects the blurs caused by the aberration and the diffraction of the optical system 302a is called out of the memory 303a and applied to the input image to generate the intermediate blur corrected image. Since the input image has a different blur at each image height, a shift variant correction is performed.

Next, in the step S403, the acquirer 303b extracts a partial optical black image from the optical black area. As illustrated in FIG. 10, one or more partial optical black images 404 are extracted from the optical black area 403. K is the number of partial optical black images to be extracted, and $m_k \times n_k$ is the number of pixels of each partial optical black image.

Next, in the step S404, the generator 303c generates a noise representation image based on the number of pixels in the input image and the partial optical black image. As illustrated in FIG. 10, the partial optical black images 404 are arranged to generate a noise representation image 405. The partial optical black image 404 is arrayed so that the number of pixels is equal to or larger than the number of pixels in the input image 402, and the noise representation image 405 is generated by extracting the number of pixels of the input image 402. In arraying the partial optical black images 404, the individual optical black images 404 may be inverted or rotated prior to being arrayed.

Next, in the step S405, the generator 303c inputs the input image, the intermediate blur corrected image, and the noise representation image into the neural network to generate the estimated image. The neural network uses the configuration illustrated in FIG. 11 and inputs the input data made by connecting the input image (corresponding to the first training image), the intermediate blur corrected image (corresponding to the second training image), and the noise representation image in the channel direction in the same order as that in the learning. Information on the weight corresponding to the optical system 302a is read out of the memory 303a, and the estimated image is generated. If the normalization or black level subtraction is performed during the input into the neural network, processing to return the scale of the signal value to the estimated image and addition of the black level are performed.

This embodiment can realize an image processing system that can suppress blurs caused by the aberration and the diffraction and be robust against noises while maintaining high accuracy and a small data amount.

Thus, the image processing method according to each embodiment has the first step and the second step. The first step acquires input data including an input image and a noise map representing a noise amount in the input image (S201, S202; S401 to S404). The second step is a step of inputting the input data to the neural network and executing a recognition or regression task (S203; S405).

Third Embodiment

A description will now be given of an image processing system according to a third embodiment of the present invention. The image processing system according to this embodiment is different from that of each of the first and second embodiments in having a processing apparatus (computer) that transmits a captured image as an image processing target to the image estimation apparatus and receives a processed output image from the image estimation apparatus.

Figure 13:
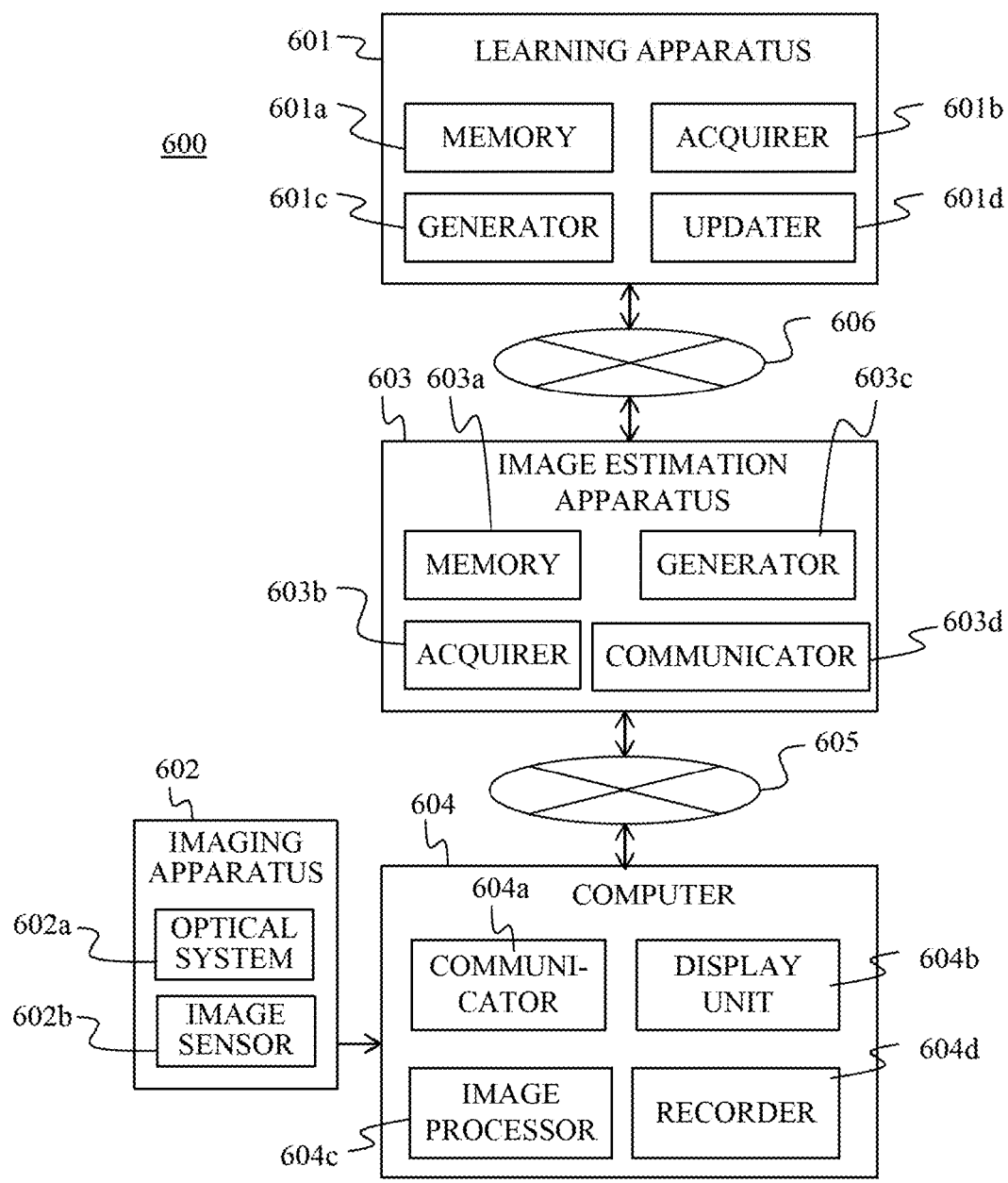
FIG. 13 is a block diagram of an image processing system according to a third embodiment.

FIG. 13 is a block diagram of an image processing system 600 according to this embodiment. The image processing system 600 includes a learning apparatus 601, an imaging apparatus 602, an image estimation apparatus 603, and a processing apparatus (computer) 604. The learning apparatus 601 and the image estimation apparatus 603 are, for example, servers. The computer 604 is, for example, a user terminal, such as a personal computer and a smartphone. The computer 604 is connected to the image estimation apparatus 603 via the network 605. The image estimation apparatus 603 is connected to the learning apparatus 601 via the network 606. That is, the computer 604 and the image estimation apparatus 603 can communicate with each other, and the image estimation apparatus 603 and the learning apparatus 601 can communicate with each other. The computer 604 corresponds to a first device, and the image estimating apparatus 603 corresponds to a second device. The learning apparatus 601 is configured similarly to the learning apparatus 301 of the second embodiment, and a description thereof will be omitted. The imaging apparatus 602 is configured similarly to the image sensor 302 of the second embodiment, and a description thereof will be omitted.

The image estimation apparatus 603 includes a memory 603a, an acquirer 603b, a generator 603c, and a communicator (receiver, transmitter) 603d. Each of the memory 603a, the acquirer 603b, and the generator 603c is the same as the memory 103a, the acquirer 103b, and the generator 103c in the image estimation apparatus 303 of the second embodiment. The communicator 603d serves to receive a request transmitted from the computer 604 and to transmit an output image generated by the image estimation apparatus 603 to the computer 604.

The computer 604 includes a communicator (transmitter) 604a, a display unit 604b, an image processor 604c, and a recorder 604d. The communicator 604a serves to transmit a request for causing the image estimation apparatus 603 to process the captured image to the image estimation apparatus 603, and to receive the output image processed by the image estimation apparatus 603. The display unit 604b serves to display various information. The information displayed by the display unit 604b includes, for example, a captured image to be transmitted to the image estimation apparatus 603 and an output image received from the image estimation apparatus 603. The image processor 604c further serves to perform image processing for the output image received from the image estimation apparatus 603. The recorder 604d records the captured image acquired from the imaging apparatus 602, an output image received from the image estimation apparatus 603, and the like.

Figure 14:
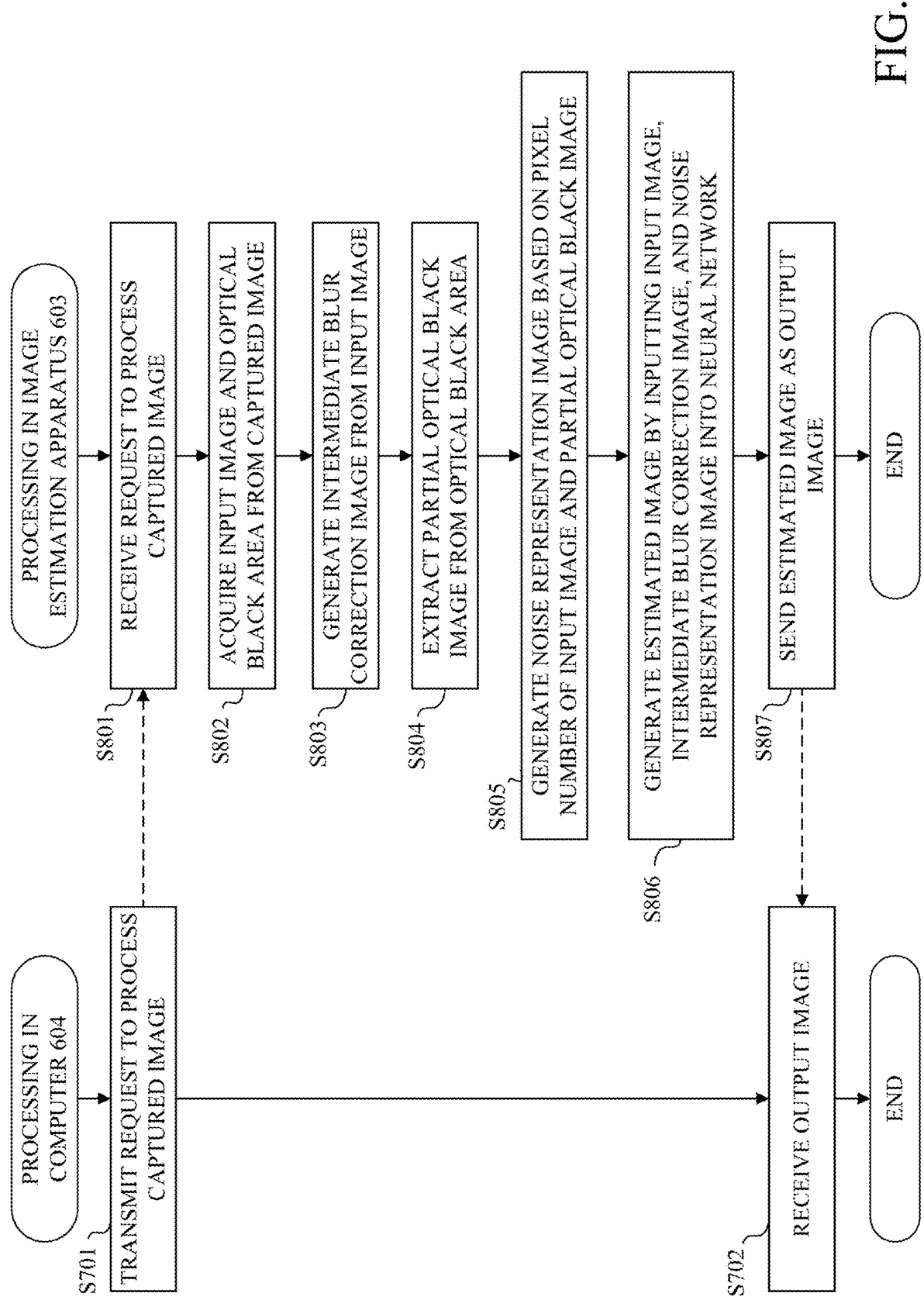
FIG. 14 is a flowchart of the way of generating an output image according to the third embodiment.

Referring now to FIG. 14, a description will be given of image processing according to this embodiment. The image processing according to this embodiment is equivalent to the blur correction (deblur) processing (FIG. 12) described in the second embodiment. FIG. 14 is a flowchart of the way of generating the output image. The image processing illustrated in FIG. 14 is started when a user issues an instruction to start the image processing via the computer 604. A description will now be given of the operation of the computer 604.

In the step S701, the computer 604 transmits a request to process the captured image to the image estimation apparatus 603. The method of transmitting the captured image to be processed to the image estimation apparatus 603 does not matter. For example, the captured image may be uploaded from the computer 604 to the image estimation apparatus 603 at the same time as the step S701, or may be uploaded to the image estimation apparatus 603 before the step S701. Instead of the image recorded in the computer 604, the captured image may be an image stored on a server different from the image estimation apparatus 603. In the step S701, the computer 604 may transmit ID information or the like for authenticating the user together with the request to process the captured image. In the step S702, the computer 604 receives the output image generated in the image estimation apparatus 603. The output image is an estimated image obtained by performing the blur correction for the captured image as in the second embodiment.

Next follows a description of the operation of the image estimation apparatus 603. In the step S801, the image estimation apparatus 603 receives the request to process the captured image transmitted from the computer 604. The image estimation apparatus 603 determines that the processing (blur correction processing) for the captured image has been instructed, and executes the processing after the step S802. The steps S802 to S806 are the same as the steps S401 to S405 in the second embodiment. In the step S807, the image estimation apparatus 603 transmits as the output image the estimated image that is the result of the regression task to the computer 604.

This embodiment performs the blur correction processing of the second embodiment, but is similarly applicable to the detection of the human area (FIG. 6) of the first embodiment. This embodiment has been described that the image estimation apparatus 603 performs all processes corresponding to S401 to S405 of the second embodiment, but the present invention is not limited to this embodiment. For example, one or more of S401 to S404 of the second embodiment (steps S802 to S806 in this embodiment) may be performed in the computer 604, and the result may be transmitted from the computer 604 to the image estimation apparatus 603.

As described above, as in this embodiment, the image estimation apparatus 603 may be configured to be controlled using the computer 604 communicably connected to the image estimation apparatus 603.

The noise map is based on an optical black area (a black level area) corresponding to the input image. The image processing method may include obtaining an optical black area corresponding to the input image. The image processing method may include extracting one or more partial optical black images that are at least part of the optical black area. The image processing method may include generating a noise map based on the number of pixels in the input image and the partial optical black image. The noise map may be generated by arraying the partial optical black images.

The image processing method may include obtaining an optical black area corresponding to the input image, calculating a dispersion (variance, standard deviation) of a signal value in the optical black area, and calculating the noise map based on the dispersion. The input image and the optical black area may be extracted from the same captured image. The number of pixels in one channel (each of R, G, B channels) of the input image and the noise map may be equal to each other. The input data may include data obtained by connecting an input image and a noise map in a channel direction. The image processing method may input the input data into the neural network after subtracting the black level from the signal value of the input data. The task may be to increase the resolution or contrast of the image.

In each embodiment, the image processing apparatus (the image processor 123, the image estimating apparatus 303) includes an acquirer (the acquirers 123a and 303b and the generator 303c) and a processor (the detector 123b and the generator 303c). The acquirer acquires input data including an input image and a noise map representing a noise amount in the input image. The processor inputs the input data into the neural network to perform a recognition or regression task. The image processing apparatus has a memory (memories 124 and 303a) for storing information on a weight used for the neural network.

In each embodiment, the image processing system includes a first device and a second device configured to communicate with the first device. The first device has a transmitter that transmits a request for causing the second device to process the captured image. The second device has a receiver, an acquirer, a processor, and a transmitter. The receiver receives the request transmitted by the transmitter. The acquirer acquires input data including a captured image and a noise map representing a noise amount of the captured image. The processor inputs the input data into the neural network to perform a recognition or regression task. The transmitter transmits the result of the task.

In each embodiment, the method of manufacturing a learned model includes an acquisition step and a learning step. The acquisition step acquires input data including a training image and a noise map representing a noise amount in the training image, and ground truth data. The learning step learns a neural network for performing a recognition or regression task using the input data and the ground truth data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can provide an image processing method and the like, each of which can maintain high accuracy and a small data amount, and improve robustness against noises in a neural network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-039088, filed on Mar. 5, 2019, which is hereby incorporated by reference herein in its entirety.

What is claimed is:

1. An image processing method comprising:
   acquiring input data including an input image and a noise map representing a noise amount in the input image based on an optical black area corresponding to the input image; and
   inputting the input data including (i) the input image and (ii) the noise map representing the noise amount in the input image based on the optical black area corresponding to the input image into a neural network to execute a task of a recognition or regression.

2. The image processing method according to claim 1, further comprising:
   acquiring the optical black area corresponding to the input image;
   extracting one or more partial optical black images that are at least part of the optical black area; and
   generating the noise map based on the number of pixels of the input image and the partial optical black image.

3. The image processing method according to claim 2, wherein the noise map is generated by arraying the partial optical black image.

4. The image processing method according to claim 1, further comprising:
   acquiring the optical black area corresponding to the input image;
   calculating a dispersion of a signal value in the optical black area; and
   generating the noise map based on the dispersion.

5. The image processing method according to claim 2, wherein the input image and the optical black area are extracted from the same captured image.

6. The image processing method according to claim 1, wherein the input image and the noise map have the same number of pixels in a single channel.

7. The image processing method according to claim 1, wherein the input data includes data acquired by connecting the input image and the noise map in a channel direction.

8. The image processing method according to claim 1, comprising subtracting a black level from a signal value of the input data prior to inputting the input data.

9. The image processing method according to claim 1, wherein the task is to make higher a resolution or contrast of an image.

10. An image processing apparatus comprising:
    an acquirer configured to acquire input data including an input image and a noise map representing a noise amount in the input image based on an optical black area corresponding to the input image; and
    a processor configured to input the input data including (i) the input image and (ii) the noise map representing the noise amount in the input image based on the optical black area corresponding to the input image into a neural network to execute a task of a recognition or regression.

11. The image processing apparatus according to claim 10, further comprising a memory configured to store information on a weight used for the neural network.

12. A non-transitory computer-readable storage medium storing a program for causing a computer to execute an image processing method,
    wherein the image processing method includes:
    acquiring input data including an input image and a noise map representing a noise amount in the input image based on an optical black area corresponding to the input image; and
    inputting the input data including (i) the input image and (ii) the noise map representing the noise amount in the input image based on the optical black area corresponding to the input image into a neural network to execute a task of a recognition or regression.

13. An image processing system comprising a first device and a second device configured to communicate with the first device,
    wherein the first device includes a transmitter configured to transmit a request for causing the second device to process a captured image, and
    wherein the second device includes:
    a receiver configured to receive the request transmitted by the transmitter;

an acquirer configured to acquire input data including the captured image and a noise map representing a noise amount in the captured image based on an optical black area corresponding to the captured image;

a processor configured to input the input data into a neural network to execute a task of a recognition or regression; and a transmitter configured to transmit a result of the task.

14. An image processing method comprising:

acquiring ground truth data and input data that includes a training image and a noise map representing a noise amount in the training image based on an optical black area corresponding to the training image; and learning a neural network for executing a task of a recognition or regression using the input data and the ground truth data.

15. A non-transitory computer-readable storage medium storing a program for causing a computer to execute an image processing method, wherein the image processing method includes:

acquiring ground truth data and input data that includes a training image and a noise map representing a noise amount in the training image based on an optical black area corresponding to the training image; and learning a neural network for executing a task of a recognition or regression using the input data and the ground truth data.

16. A method for manufacturing a learnt model comprising:

acquiring ground truth data and input data that includes a training image and a noise map representing a noise amount in the training image based on an optical black area corresponding to the training image; and learning a neural network for executing a task of a recognition or regression using the input data and the ground truth data.

17. An image processing apparatus comprising:

an acquirer configured to acquire ground truth data and input data that includes a training image and a noise map representing a noise amount in the training image based on an optical black area corresponding to the training image; and a learner configured to learn a neural network for executing a task of a recognition or regression using the input data and the ground truth data.

* * * * *